United States Patent [19]

Merrick

[11] 4,323,738
[45] Apr. 6, 1982

[54] PORTABLE TELEPHONE LINE TEST SET

[75] Inventor: Llewellyn S. Merrick, Wilbraham, Mass.

[73] Assignee: Oros Corporation, Nutley, N.J.

[21] Appl. No.: 138,825

[22] Filed: Apr. 10, 1980

[51] Int. Cl.³ .......................... H04M 5/00; H04B 3/46
[52] U.S. Cl. ............................................. 179/175.1 R
[58] Field of Search ......... 179/175, 175.1 R, 175.2 R, 179/175.3 R, 175.3 A; 324/57 R

[56] References Cited

U.S. PATENT DOCUMENTS

| | | | |
|---|---|---|---|
| 3,790,723 | 2/1974 | Stewart | 179/175.3 R |
| 3,792,205 | 2/1974 | O'Dea | 179/175 |
| 3,822,366 | 7/1974 | O'Dea et al. | 179/175.3 A |
| 3,870,836 | 3/1975 | Kusama | 179/175 |
| 3,881,153 | 4/1975 | Harzer | 179/175.3 R |

Primary Examiner—Thomas A. Robinson
Attorney, Agent, or Firm—Pennie & Edmonds

[57] ABSTRACT

A portable two wire line test set having a self-contained source of electrical energy for powering a hybrid circuit and first and second amplifier means. The first amplifier receives and amplifies voice signals transmitted over the two wire line and the second amplifier amplifies and transmits voice signals over the two wire line. Transducer means are connected to both amplifiers to convert signals to audible sounds and vice versa. In an alternative embodiment a third tuned amplifier means is included for detecting and amplifying a signal in a predetermined frequency range so that the identity and condition of particular two wire lines may be determined.

2 Claims, 4 Drawing Figures

4,323,738

PORTABLE TELEPHONE LINE TEST SET

BACKGROUND OF THE INVENTION

1. Field of the Invention

This invention relates generally to full duplex two wire voice communication systems and more particularly to a portable device for testing live or dead two wire circuits using a conventional three terminal carbon telephone headset for voice testing and a highly sensitive tuned amplifier for tone testing.

2. Description of the Prior Art

Full duplex two wire voice communication is well known and is generally exemplified in the two wire telephone systems used through the world. Many problems with telephone systems have been addressed, particularly problems associated with compensation for poor transmission. For example, U.S. Pat. No. 3,963,876 issued to R. E. Holts and R. A. Radosevich, discloses a device for providing extra transmit and receive amplification for a conventional telephone set. The device also includes voice switched means to provide sidetone control. This device, like most apparatus associated with improving or testing telephone communications obtains power from the transmit part of a conventional telephone hybrid speech network. In contrast, the test set of the invention is powered from a self contained power supply.

Known telephone test equipment also depends on power available from conventional hybrid speech networks. Thus, communication between repairmen at different field locations or between a repairman and a central office depends upon the existence of a live telephone pair common to the two locations seeking to communicate. This is usually accomplished by a repairman dialing into a central exchange and being connected to another repairman over live wire pairs through the exchange. Such a system typically requires some form of auxiliary wireless communication system to effectively co-ordinate the repair effort. The device of the invention eliminates the problem of the necessity for a live wire pair by including a power supply and conventional hybrid speech circuit in the same unit. This feature not only provides an ability to test dead wire pairs but also obviates the need for an auxiliary communication system.

SUMMARY OF THE INVENTION

The present invention is a portable full duplex two wire voice communication test set capable of reception and transmission of audio signals. An additional feature of the test set utilizes a high gain low noise tuned amplifier in conjunction with a detector device and the receive amplifier as an aid in signal tracing using standard tone signals, e.g. 575 Hz or 800 Hz.

Specifically, the test set of the invention uniquely combines a hybrid full duplex circuit, two low power consumption audio amplifiers, and a high gain, high input impedance, low noise tuned amplifier with a stable battery power supply to provide independent two way voice communication over either live or dead two wire telephone lines, and includes the capability of detecting tone signals for signal tracing over such lines. The entire device is hand held, completely portable and may be used with a standard three terminal telephone headset.

BRIEF DESCRIPTION OF THE DRAWINGS

The advantages, nature and various features of the invention will appear more fully upon consideration of the various illustrative embodiments now to be described in detail in the accompanying drawings. In the drawings.

DESCRIPTION OF THE PREFERRED EMBODIMENT

Figure 1:
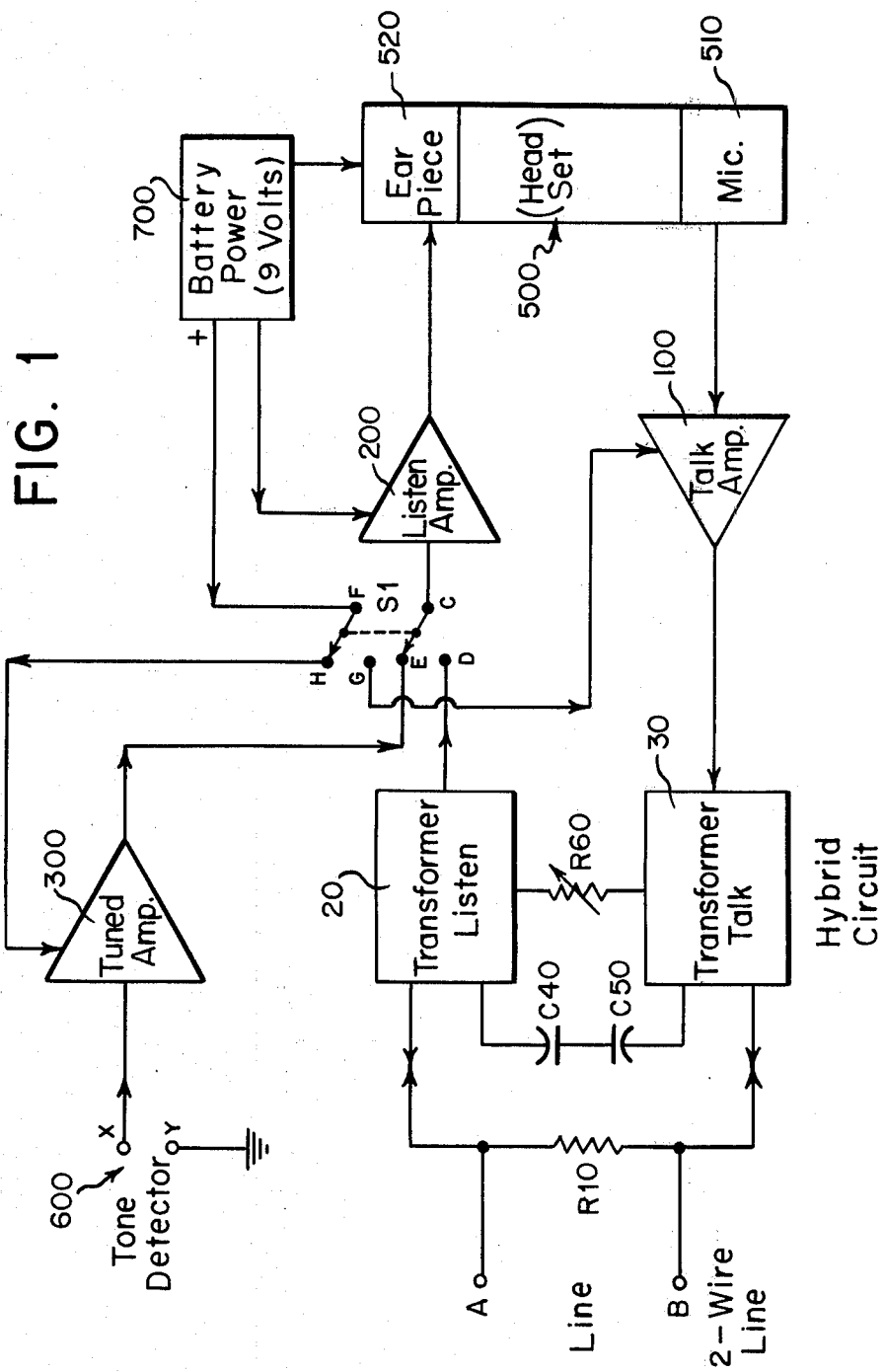
FIG. 1 is a block diagram of the portable test set of the invention.

Referring to FIG. 1, there is shown in block form a diagram of the portable test set of the invention having terminals, A, B for connection to a two wire line to be tested. The terminals A, B are connected across shunt resistor R10 to listen transformer 20 and talk transformer 30. The transformers 20 and 30 are connected as a hybrid circuit through capacitors C40, C50 and balance control potentiometer R60. This hybrid circuit connection is more fully described in connection with FIG. 2. The talk transformer 30 in turn is connected to the output of talk amplifier 100. The input to talk amplifier 100 is the microphone portion 510 of headset 500. Returning now to the receive branch of the circuit, listen transformer 20 is connected through pole C-D of double pole double throw switch S1 to the input of listen amplifier 200. The output of listen amplifier 200 drives earpiece 520 of the headset 500. Returning now to switch S1, it can be seen that this switch is used to place the test set in either the communication or trace mode of operation. Thus, in the communication mode, the output of the listen transformer 20 is connected to the input of listen amplifier 200 through pole C-D and B+ battery power from power supply 700 is applied to talk amplifier 100 through pole F-G. In the trace mode of operation B+ battery power is applied to tuned amplifier 300 through pole F-H and the output of tuned amplifier 300 is input to listen amplifier 200 through pole C-E. In the trace mode a tone detector 600, which may be either magnetic or capacitive, is input to tuned amplifier 300. The tuned amplifier 300 is a high gain, low noise circuit having a very high input impedance and produces a usable sensitivity of in excess of −100 dbm at the selected resonant frequency, which is typically either 575 Hz or 800 Hz for use in most telephone communication systems.

Figure 2:
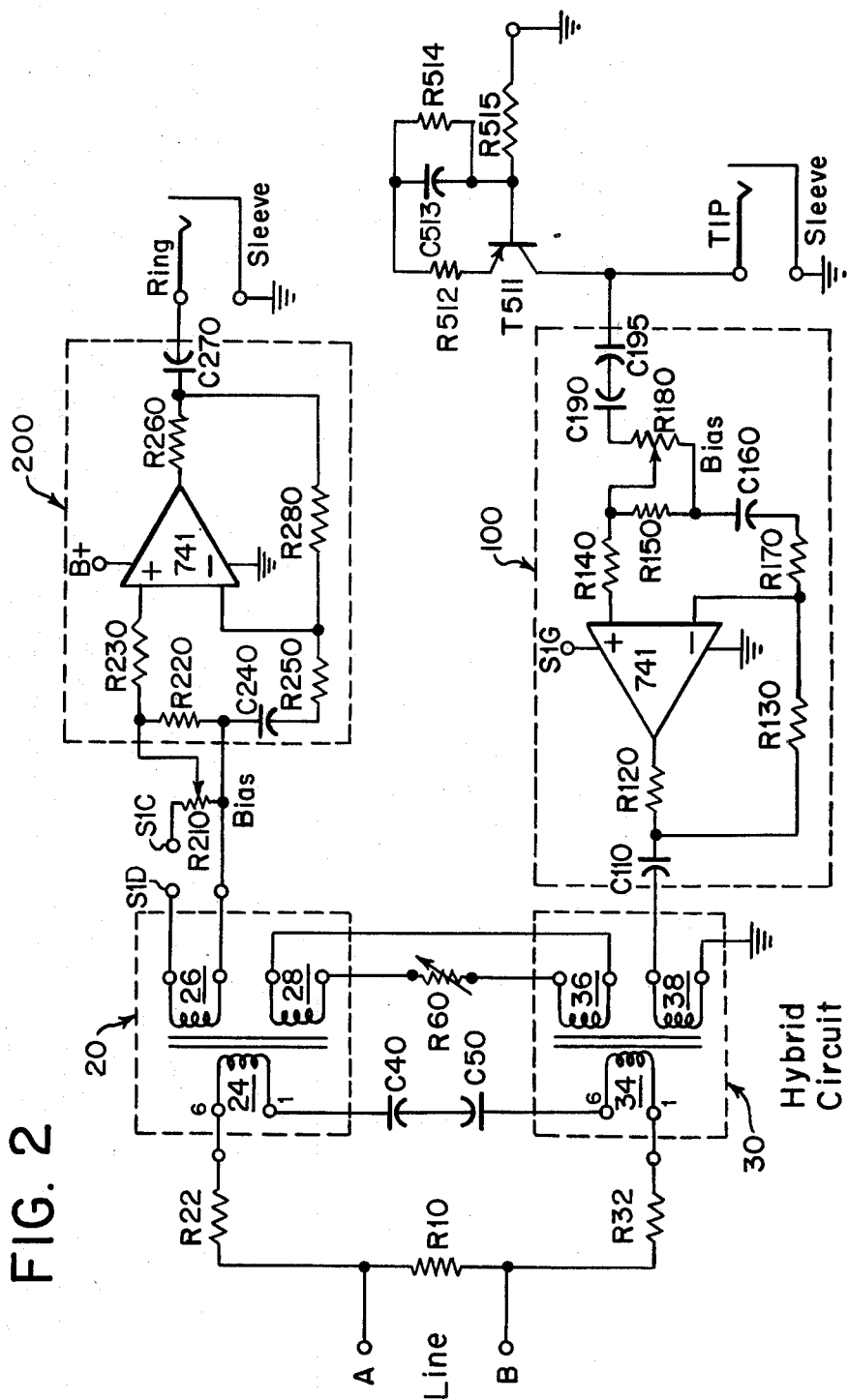
FIG. 2 is a circuit schematic of the voice communication portion of the invention.

Referring now to FIG. 2, there is shown a circuit schematic of the communication portion of test set of the invention. As can be seen test terminals A, B are connected across shunt resistor R10 and connected to listen transformer 20 through resistor R22 and to talk transformer 30 through resistor R32. The transformers 20, 30 are identical iron core transformers having respective windings 24, 26, 28 and 34, 36, 38 connected to form a conventional telephone hybrid circuit. Thus, terminal 6 of winding 24 is connected to resistor R22 and terminal 1 of winding 24 is connected through capacitors C40, C50 to terminal 6 of winding 34, terminal 1 of which is connected to resistor R32. Windings 28 and 36 are connected in series through balance control potentiometer R60.

When the test set is in the communication mode, the output of listen transformer 20 is obtained from winding 26 which is connected through pole C-D of S1 across listen level control potentiometer R210. The wiper arm of R210 is input to listen amplifier 200 by connection across resistor R220, a part of input and feedback network R230, R220, C240, R250 and R280 to an integrated circuit amplifier type 741 such as can be obtained from Signetics Corp., Sunnyvale, California. The integrated circuit amplifier is outputted through network R260 and C270, which is connected to the ring terminal of a three conductor headset phone jack and optionally to a binding post not shown.

Referring now to the transmit portion of FIG. 2, the output of talk amplifier 100 drives talk transformer 30 through winding 38 which is connected between output capacitor C110 and common ground. The other side of capacitor C110 is connected at the junction of output resistor R120 and feedback resistor R130, which along with C110 form the output network for an integrated circuit amplifier type 741 identical to that employed in listen amplifier 200. The input network of this amplifier R140, R150, C160 and R170 is identical to the input network employed in listen amplifier 200. The wiper arm of level control potentiometer R180 is connected across R150. One side of both R150 and R180 are at bias voltage level. The other side of R180 is connected through capacitors C190, C195 to the tip terminal of a three conductor headset phone jack and optionally to a binding post not shown. Also connected to the tip terminal is the collector terminal of transistor T511 which is part of microphone power circuit R512, C513, R514 and R515.

Figure 3:
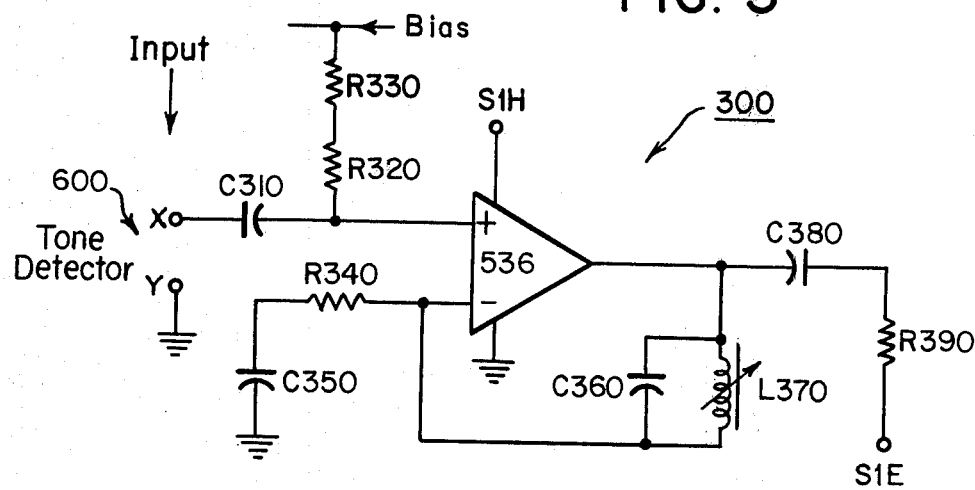
FIG. 3 is a circuit schematic of the tuned amplifier used in a preferred embodiment of the invention.

Referring now to FIG. 3 there is shown a circuit schematic of tuned amplifier 300. When the test set is switched to the trace mode B+ battery power is removed from talk amplifier 100 and applied to tuned amplifier 300 through pole F-H of S1, simultaneously the input to listen amplifier 200 is switched from the output of listen transformer 20 to the output of tuned amplifier 300 through pole C-E of S1. The input to tuned amplifier 300 is a tone sensor 600, which may be either capacitive or magnetic, that is connected between common ground and one side of capacitor C310. The other side of capacitor 310 is connected to an input terminal of an integrated circuit amplifier type 536 such as can be obtained from the Signetics Corp., Sunnyvale, California. Bias voltage is also connected to this input terminal through resistors R320 and R330. The other input to this integrated circuit amplifier is connected through R340 and C350 to common ground and through feedback resonant tank circuit C360, L370 to its output terminal. The tank circuit C360, L370 is adjusted to the desired resonance frequency of tuned amplifier 300, typically either 575 Hz or 800 Hz. The output of this amplifier is also connected through output network C380, R390 and pole C-E of S1 to the input of listen amplifier 200.

Figure 4:
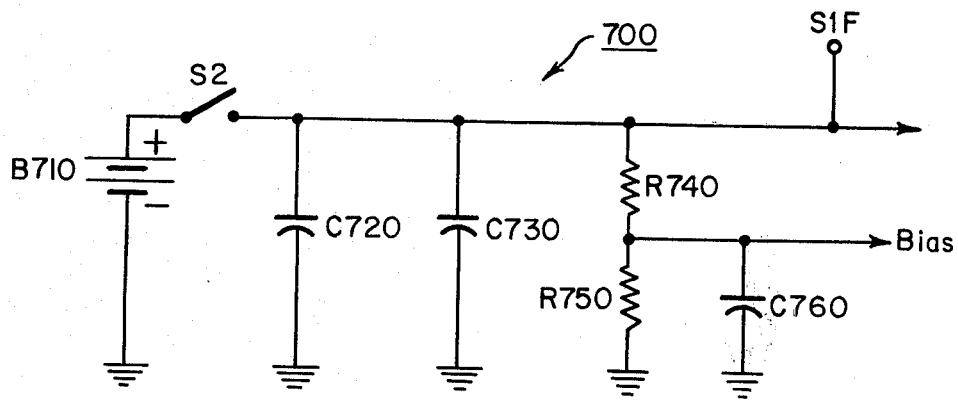
FIG. 4 is a circuit schematic of the battery power supply of the invention.

Referring now to FIG. 4 there is shown a circuit schematic for battery power supply 700. The power supply includes a 9 volt battery B170 which is commonly referred to as a transistor battery and may be of the long lasting alkaline type. Battery B710 is connected through switch S2 across filter capacitors C720, C730 and voltage divider R740, R750. The center tap of voltage divider R740, R750 is connected across additional filter capacitor C760 to provide a bias voltage supply. This power supply maximizes stability and minimizes spurious oscillations or "motorboating" over a wide range of battery impedances.

In operation in the communication mode, the line terminals, A, B of tow test sets are connected to the line to be tested by repairmen at each end of the line. Headsets are plugged into the respective jacks of the test sets, switch S1 is set to the communication mode, and power switch S2 is turned on. Each operator in turn then adjusts the balance control potentiometer R60 for minimum amplification of his talk signal by the listen amplifier 200 by, for example, whistling into his microphone. Normal communications may now take place between the repairmen without the necessity of going through central exchange switching equipment and regardless of whether the chosen line is live or dead.

In the trace mode a tone sensor is connected to the terminals X-Y, the test set is switched to the trace mode and the power switch S2 is turned on. Tones detected by the sensor are selectively amplified by the tuned amplifier 300 and made available in the earpiece of a headset by listen amplifier 200. In this manner, tone carrying lines can be identified and traced and shorts can be located.

Preferred values of the components in the schematics of FIGS. 2, 3 and 4 are given in Table I.

TABLE I

| Component | Value |
|---|---|
| R10, R512 | 470 ohms |
| R22, R32 | 220 ohms |
| C40, C50, C513 | 47 microfarads 25 volts |
| R60, R140, R390 | 1000 ohms |
| C110, C270, C720, C730 | |
| C760 | 100 microfarads 10 volts |
| R120, R260, R340 | 47 ohms |
| R130, R150, R220, R280 | 100 kilo ohms |
| R170, R250 | 2.2 kilo ohms |
| C160, C240 | 5 microfarads 10 volts |
| R180, R210 | 5 kilo ohms |
| C190, C195 | 1 microfarad 10 volts |
| R514, R515 | 22 kilo ohms |
| C310 | .001 microfarads |
| C380 | 0.1 microfarad |
| R740, R750 | 10 kilo ohms |
| B710 | 9 volts |
| T511 | 2N2907 |
| 20, 30 | Hybrid transformer Triad TY-302P |

The portable telephone line test set of the invention has been described in terms of a specific preferred embodiment, however, alterations or substitutions may be made by those skilled in the art without going beyond the scope of the appended claims.

I claim:

1. A portable two wire line test set comprising:
   (a) power supply means for providing electrical energy;
   (b) hybrid circuit means for connecting to a telephone line;
   (c) first amplifier means connected to said power supply means and to said hybrid circuit means for receiving and amplifying voice signals;
   (d) second amplifier means connectable to said power supply means and to said hybrid circuit means for amplifying and transmitting voice signals;
   (e) transducer means connected to said first amplifier means for converting said voice signals into audible sounds; and (f) transducer means connected to said second amplifier means for converting audible sound into voice signals.

2. A test set in accordance with claim 1 further comprising:
 (a) tuned amplifier means connectable to said power supply means and connectable to said first amplifying means for amplifying a signal in a predetermined frequency range; and
 (b) means for connecting a signal to said tuned amplifier means whereby identifying tones on particular two wire lines are made audible when said tuned amplifier is connected to said first amplifier.

* * * * *

UNITED STATES PATENT AND TRADEMARK OFFICE
CERTIFICATE OF CORRECTION

PATENT NO. : 4,323,738
DATED : April 6, 1982
INVENTOR(S) : Llewellyn S. Merrick

It is certified that error appears in the above—identified patent and that said Letters Patent is hereby corrected as shown below:

Column 3, line 61 "B170" should read --B710--

Column 4, line 4 "tow" should read --two--

Signed and Sealed this

First Day of June 1982

[SEAL]

Attest:

GERALD J. MOSSINGHOFF

Attesting Officer     Commissioner of Patents and Trademarks